United States Patent [19]
Maruyama et al.
[11] Patent Number: 4,682,077
[45] Date of Patent: Jul. 21, 1987

[54] TELEVISION CAMERA TUBE DEVICE

[75] Inventors: Masanori Maruyama, Kokubunji; Masamichi Moriya; Shinichi Kato, both of Mobara; Masakazu Fukushima, Tokyo; Yasuhiko Nonaka, Mobara; Chihaya Ogusu, Tokyo, all of Japan

[73] Assignees: Nippon Hoso Kyokai; Hitachi, Ltd., both of Tokyo, Japan

[21] Appl. No.: 755,014

[22] Filed: Jul. 15, 1985

[30] Foreign Application Priority Data

Jul. 18, 1984 [JP] Japan ........................ 59-147540

[51] Int. Cl.$^4$ ........................ H01J 29/46; H04N 5/228

[52] U.S. Cl. ........................ 315/14; 358/223; 358/219; 313/348; 313/346 DC

[58] Field of Search ........................ 315/14, 15, 16; 358/219, 223; 313/348, 346 DC, 346 R, 447, 453

[56] References Cited

U.S. PATENT DOCUMENTS

| | | | |
|---|---|---|---|
| 3,740,607 | 6/1973 | Silzars et al. | 313/453 |
| 3,975,657 | 8/1976 | Sato et al. | 358/219 |
| 3,980,919 | 9/1976 | Bates et al. | 313/453 |
| 4,237,491 | 12/1980 | Olson et al. | 358/223 |
| 4,322,662 | 3/1982 | Nakamura et al. | 358/219 |
| 4,363,996 | 12/1982 | Mizushima et al. | 313/449 |
| 4,388,556 | 6/1983 | Rao | 315/14 |
| 4,400,648 | 8/1983 | Taguchi et al. | 313/346 DC |
| 4,427,927 | 1/1984 | Nakamura | 358/219 |
| 4,467,243 | 8/1984 | Fukushima et al. | 313/348 |
| 4,518,890 | 5/1985 | Taguchi et al. | 313/346 DC |
| 4,540,916 | 9/1985 | Maruyama et al. | 315/16 |
| 4,549,113 | 10/1985 | Rao | 315/14 |
| 4,593,230 | 6/1986 | True | 315/14 |

OTHER PUBLICATIONS

SMPTE Journal, V 92, No. 10, 10/83, pp. 1041–1046, "Performance Characteristics of Improved Pickup Tube".

*Primary Examiner*—Theodore M. Blum
*Assistant Examiner*—David Cain
*Attorney, Agent, or Firm*—Antonelli, Terry & Wands

[57] ABSTRACT

A camera tube device for use in a television camera comprises an electron gun including a cathode electrode for emission of an electron beam, and first and second grid electrodes respectively having apertures for controlling the diameter of the electron beam. The aperture of the second grid electrode is sufficiently smaller than the aperture of the first grid electrode. The first grid electrode is applied with a positive voltage relative to the cathode electrode and the second grid electrode is applied with a positive voltage relative to the cathode electrode which is higher than that applied to the first grid electrode. The positive voltage applied to the first grid electrode has such a value that forms the electron beam having passed through the aperture of the first grid electrode into a laminar flow beam. As the level of brightness of the object increases, the positive voltage applied to the first grid electrode is decreased to increase the amount of electron beam passing through the aperture of the second grid electrode.

12 Claims, 9 Drawing Figures

TELEVISION CAMERA TUBE DEVICE

BACKGROUND OF THE INVENTION

This invention relates to a television camera tube device and more particularly to an improvement thereof wherein a laminar flow electron beam is generated under a normal operation and a high beam current can be obtained as necessary.

In a vidicon type television camera tube, a pattern of electric charges corresponding to a level of brightness of the object is formed on a photoconductive layer, the photoconductive layer is scanned with an electron beam emitted from an electron gun to sequentially discharge the patterned electric charges, and a charging current corresponding to the sequential discharging is delivered out of the tube as a signal. The whole amount of the electric charge once generated in accordance with the object is not usually discharged completely during one cycle of beam scanning. Consequently, even when the object disappears from view of the tube, a false signal corresponding to a residual electric charge is generated during the ensuing cycles of beam scanning to produce a signal lag and hence the quality of the picture is degraded when a moving object is picked up.

Particularly, in a television camera tube with a blocking type photoconductive layer, the signal lag is mainly due to a capacitive signal lag having a time constant which is determined by a product of an electrostatic capacitance of the photoconductive layer and a beam resistance of the scanning electron beam. The beam resistance is equivalent to a velocity distribution of electrons which form the electron beam and in order to realize a low lag characteristic, the electron beam is required to have a narrow velocity distribution of electrons.

As well known in the art, the electrons emitted from the cathode electrode have a velocity distribution subject to a Maxwellian distribution but when the electrons are converged to a narrow beam having an increased current density, an energy relaxation phenomenon due to coulomb force interaction between the electrons takes place to broaden the velocity distribution. This phenomenon is called the Boersh effect, and as also well known in the art, the broadening rate of the velocity distribution is approximately proportional to $J(z)^{\frac{1}{3}}$, where J(z) represents current density on the beam axis.

Accordingly, in a television camera tube aiming at the low lag characteristic, an increase in the beam current density must be suppressed as far as possible. To this end, a diode type electron gun has been proposed (for example, in U.S. Pat. No. 3,894,261) wherein a first grid electrode opposing a cathode electrode is connected to receive a positive voltage relative to the cathode electrode so as to cause electrons to be emitted from the cathode electrode in parallel with the tube axis, thereby generating a laminar flow electron beam which does not form a crossover where current density is high. In this type of diode type electron gun for generation of the laminar flow electron beam, however, the amount of beam current is proportional to the emission current density from the cathode electrode and therefore in order to obtain a high beam current, it is necessary to increase the current density emitted by the cathode electrode to an extreme and accordingly there arise difficulties in expanding the dynamic range of the beam current amount for the sake of operating an automatic beam optimizer (hereinafter referred to as ABO) which controls the amount of beam current in accordance with a level of brightness of the object.

SUMMARY OF THE INVENTION

An object of this invention is to provide a television camera tube device which can eliminate the disadvantages of the diode type electron gun for generation of a laminar flow beam and which can expand the dynamic range of the beam current amount to permit the operation of the ABO and to achieve a low lag characteristic.

To accomplish the above object, a television camera tube device according to this invention comprises an electron gun including a cathode electrode for emitting an electron beam, a first grid electrode having an aperture, and a second grid electrode having an aperture. The first grid electrode is connected to receive a positive voltage relative to the cathode electrode and the second grid electrode is connected to receive a positive voltage which is higher than that applied to the first grid electrode, so as to form a convergent electron lens near the aperture of the first grid electrode. The strength of the convergent electron lens is controlled by the voltage applied to the first grid electrode to thereby control the amount of electron beam current passing through the aperture of the second grid electrode. More specifically, during normal operation (in which the amount of reference signal current is set to 0.4 $\mu$A to 0.5 $\mu$A and the beam current is set to two to three times the reference signal current amount, for a one-inch size camera tube for a high definition television), the voltage applied to the first grid electrode is set to be high, amounting to several tens of volts relative to the cathode electrode, so as to weaken the effect of the convergent electron lens near the aperture of the first grid electrode to thereby generate a laminar flow electron beam whose electron trajectory is substantially parallel to the tube axis. As the brightness of the object increases, a high beam current is required and the normal operation shifts to an ABO operation (requiring an amount of current which is 3 to 4 $\mu$A for the one-inch size television camera tube). During the ABO operation, the voltage applied to the first grid electrode is lowered so that the effect of the convergent lens near the aperture of the first grid electrode is strengthened to converge the electrons to a crossover, thereby obtaining a high beam current. Thus, the television camera tube device according to this invention features a reverse swing type operation in which the voltage applied to the first grid electrode is lowered, in contrast to the conventional technique, when a large current needs to be generated.

In this manner, according to this invention, the voltage of the first grid electrode is increased to generate the laminar flow beam during the normal operation in which the beam current is set to be several times the reference signal current and is decreased through the reverse swing operation under lower cathode loading to generate a high beam current during the ABO operation which requires the high beam current, thereby making it possible to realize a television camera tube device which is very advantageous from the standpoint of improvements in lifetime and reliability of the cathode electrode, improvements in resolution of the television camera tube and suppression of the signal lag.

DESCRIPTION OF THE PREFERRED EMBODIMENT

The invention will now be described by way of example with reference to the accompanying drawings.

Figure 1:
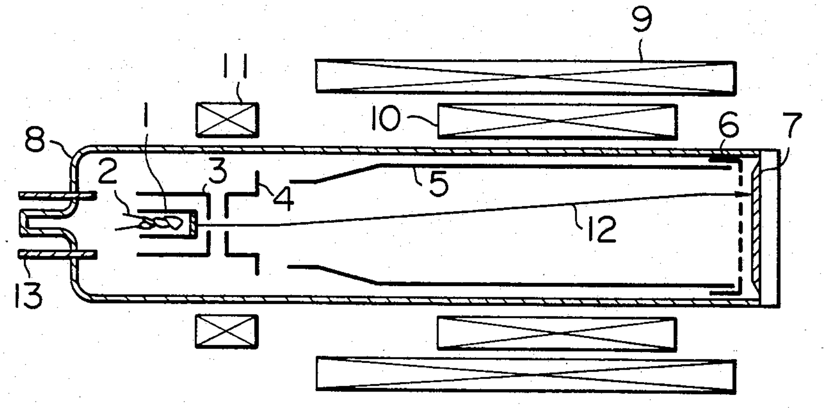
FIG. 1 shows a schematic construction of a television camera tube device to which the invention is applied.

As schematically shown in FIG. 1, a vidicon type television camera tube device to which the invention is applied comprises a cathode electrode 1, a heater 2, a first grid electrode 3, a second grid electrode 4, a third grid electrode 5, a fourth grid electrode 6 having a mesh electrode, and a target 7 in the form of a photoconductive layer. These components are accommodated in a vacuum enclosure 8. The device further comprises a focusing coil 9, a deflection coil 10, and an alignment coil 11. An electron beam 12 emitted from the cathode electrode 1 is formed into a narrow beam by means of an electron gun formed by the first and second grid electrodes 3 and 4, focused on the photoconductive layer target 7 by means of a magnetic lens formed by the focusing coil 9, and scanned by a magnetic field generated by the deflection coil 10. Voltages are applied from outside to the respective electrodes via stems 13 mounted to one end of the vacuum enclosure 8. The invention will be described herein by referring to the electromagnetic focus and electromagnetic deflection camera tube device for illustration purpose only but it may be applied to any types of beam focusing and deflection which are formed by an electromagnetic focus and electrostatic deflection camera tube device, an electrostatic focus and electromagnetic deflection camera tube device, and an electrostatic focus and electrostatic deflection camera tube device.

Figure 2:
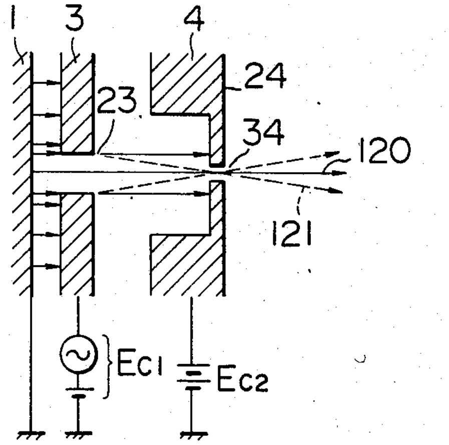
FIGS. 2 and 3 are enlarged fragmentary sectional views showing essential parts of an electron gun used in the television camera tube device of this invention.
Figure 3:
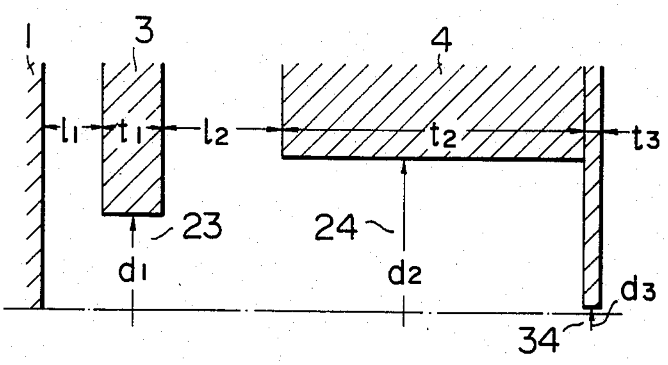

Essential parts of a diode type electron gun used for the present invention are illustrated in fragmentary sectional views of FIGS. 2 and 3. An aperture 23 formed in the first grid electrode 3 serves to restrict the diameter of the electron beam emitted from the cathode electrode 1. The second grid electrode 4 has a re-entrant cavity 24. An aperture 34 formed in the second grid electrode 4 serves to control the diameter, divergent angle and current amount with respect to the electron beam travelling to the succeeding focusing system.

Preferably, a barium impregnated cathode capable of producing a high emission current density is used as the cathode electrode 1. This cathode electrode can be prepared by impregnating into a porous tungsten pellet BaO, CaO and $Al_2O_3$ at a standard composition ratio of 4:1:1 and by welding a resulting pellet to an upper end of a sleeve made of, for example, tantalum. The surface of the resulting pellet may preferably be coated with an element such as Ir or Os in order to further improve the electron emission characteristics. The impregnated cathode electrode can be operated at a high temperature of about 900° to 1100° C. (brightness temperature). The first grid electrode 3, because of its disposition opposing the cathode electrode 1 operating at the high temperature and its reception of a high incoming current, is preferably made of a high melting point material such as tantalum.

Referenced to the cathode electrode, a voltage $E_{c2}$ which is 100 to 300 V is applied to the second grid electrode 4. Applied to the first grid electrode 3 is a signal voltage for the ABO operation corresponding to a level of brightness of the object which is superimposed on a reference DC voltage. By changing a resultant sum voltage $E_{c1}$, the effect of the electron lens near the aperture 23 of the first grid electrode 3 can be changed so as to selectively generate a laminar flow beam 120 or a crossover beam 121.

The electrodes of the electron gun shown in FIG. 2 are dimensioned as illustrated in FIG. 3. It is diagrammatically shown in FIG. 3 that the distance between the cathode electrode 1 and first grid electrode 3 is $l_1$, the distance between the first grid electrode 3 and second grid electrode 4 is $l_2$, the thickness of the first grid electrode 3 is $t_1$, the effective thickness of the second grid electrode 4 is $t_2$, the thickness of a portion of the second grid electrode where the aperture 34 is formed is $t_3$, the diameter of the aperture 23 is $d_1$, the diameter of the re-entrant cavity 24 in the second grid electrode 4 is $d_2$, and the diameter of the aperture 34 in the second grid electrode 4 is $d_3$.

Figure 7:
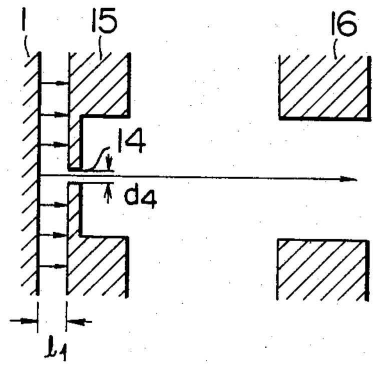
FIG. 7 PRIOR ART
FIG. 7 is an enlarged fragmentary sectional view showing essential parts of a conventional diode type electron gun.

It is now assumed that the voltage $E_{c2}$ applied to the second grid electrode 4 is 300 V, the diameter $d_3$ of the aperture 34 is 10 $\mu$m, and the distance $l_1$ is 0.1 mm. It is then to be noted that with these values specified as above, a beam current of 0.8 $\mu$A (twice a reference signal current of 0.4 $\mu$A) is obtained under the application of a voltage of about 30 V to a first grid electrode 15 of a conventional electron gun as shown in FIG. 7 having a second grid electrode 16 applied with 300 V. Additionally, it is assumed that the thickness $t_1$ of the first grid electrode 3 is 0.1 mm, the effective thickness $t_2$ of the second grid electrode 4 is 0.5 mm, the thickness $t_3$ of the apertured portion of the second grid electrode 4 is 0.03 mm, the distance $l_2$ is 0.2 mm, the diameter $d_1$ of the aperture 23 is 0.3 mm, and the diameter $d_2$ of the re-entrant cavity 24 is 0.5 mm for a first embodiment or 0.3 mm for a second embodiment.

The electron gun used for the device of the present invention is by no means limited dimensionally to the above examples but preferably, the distance $l_1$ ranges from 0.05 mm to 0.15 mm, the diameter $d_3$ of the aperture 34 ranges from 0.008 mm to 0.015 mm, and the diameter $d_1$ of the aperture 23 ranges from 0.1 mm to 0.5 mm.

Figure 4:
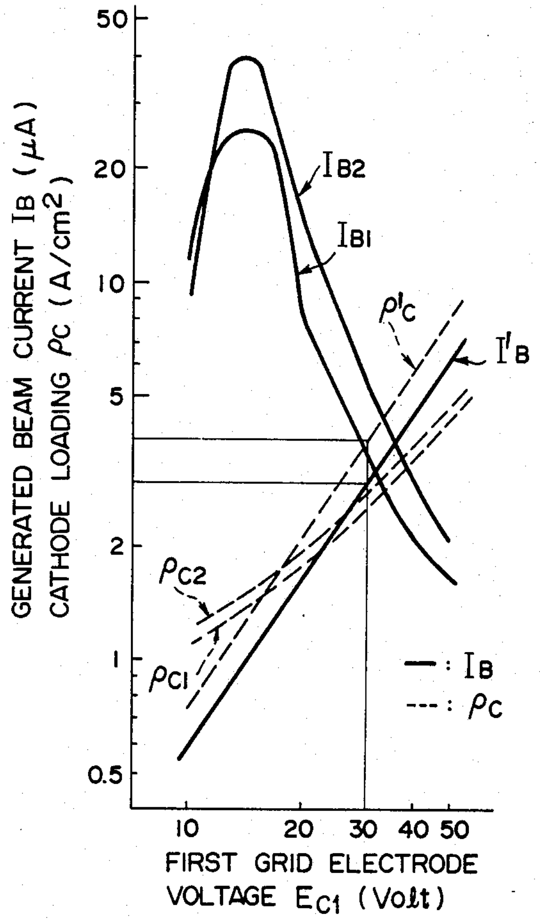
FIG. 4 is a graphical representation for comparison of beam characteristics obtained from an embodiment of the invention with those obtained from a conventional device.

FIG. 4 graphically shows, in connection with the first and second emnbodiments and the conventional example set forth herein, changes in the generated beam current $I_B$ passing through the aperture 34 in the second grid electrode 4 and in the emission current density (called cathode loading) $\rho_c$ at the center of the cathode electrode with respect to the voltage $E_{c1}$ of the first grid electrode. Here, the generated beam current $I_B$ is about four times the amount of beam current utilized for practical pick-up operations. Such a large amount of generated beam current $I_B$ is necessary because the mesh electrode 6 shown in FIG. 1 has a transparent ratio of about 50% and the photoconductive layer target 7 also shown in FIG. 1 has an electron beam utility of 50%. Accordingly, for the reference signal current amount being 0.4 $\mu$A, an amount of beam current $I_B$ measuring $0.8\times4=3.2$ $\mu$A is necessary for extracting therefrom a 0.8 $\mu$A beam current (twice the reference signal current) under the normal operation and an amount of beam current $I_B$ measuring $4\times4=16$ $\mu$A is necessary for extracting therefrom a 4 $\mu$A (ten times the reference signal current) under the ABO operation.

In FIG. 4, solid curves represent the generated beam current $I_B$ and dotted curves represent the cathode loading $\rho_c$.

When, in the conventional example of FIG. 7 having a cathode electrode 1, the first grid electrode 15 and the second grid electrode 16, the distance between the cathode electrode 1 and first grid electrode 15 is $l_1$ and the voltage applied to the first grid electrode 15 is $E_{c1}$, the cathode loading $\rho_c'$ is indicated by using a Child-Langmuir formula stipulated for parallel plate electrodes as follows:

$$\rho_c' = 2.34 \times 10^{-6} \cdot \frac{E_{c1}^{3/2}}{l_1^2}$$

Accordingly, where the diameter of an aperture in the first grid electrode 15 is $d_4$, the generated beam current $I_B'$ is given by, $$I_B' = \rho_c' \cdot \frac{\pi}{4} \cdot d_4^2.$$

As will be seen from the above, in the conventional example, $\rho_c' \alpha E_{c1}^{3/2}$ and $I_B' \alpha E_{c1}^{3/2}$ are valid and an increase in the generated beam current $I_B'$ directly leads to an increase in the cathode loading $\rho_c'$. For obtaining the results in FIG. 4, dimensional values of the conventional example are such that the distance $l_1$ between the cathode electrode 1 and first grid electrode 15 is 0.1 mm and the diameter $d_4$ of the aperture 14 in the first grid electrode 15 is 10 $\mu$m. In order to obtain a generated beam current $I_B'$ of 3.2 $\mu$A, a voltage $E_{c1}$ of about 30 V is applied to the first grid electrode 15 with an attendant increase in cathode loading $\rho_c'$ of 4 A/cm$^2$. Characteristics in FIG. 4 clearly show that the conventional example has difficulties with the ABO operation which requires a large amount of beam current.

Contrary to this, both the first and second embodiments shown in FIGS. 2 and 3 can afford to provide the generated beam currents $I_{B1}$ and $I_{B2}$ having peak values under the application of a voltage $E_{c1}$ of about 15 V, the peak values amounting to more than 20 $\mu$A which is sufficient to permit the ABO operation. Taking first the first embodiment, for instance, the voltage $E_{c1}$ of the first grid electrode may be set to about 30 V in order to obtain a generated beam current $I_{B1}$ of 3.2 $\mu$A. Under this condition, the cathode loading $\rho_{c1}$ is about 2.5 A/cm$^2$ and a laminar flow beam is generated. The first grid electrode voltage $E_{c1}$ is then set to 17 V through the reverse swing to form a crossover beam which is effective to provide a generated beam current $I_{B1}$ of about 16 $\mu$A, thereby permitting the ABO operation. Under this condition, the cathode loading $\rho_{c1}$ is decreased to 1.5 A/cm$^2$ which is about half the cathode loading $\rho_{c1}$ for the normal operation and which can perfectly prevent the cathode emission life time from being degraded even under the ABO operation.

Figure 5:
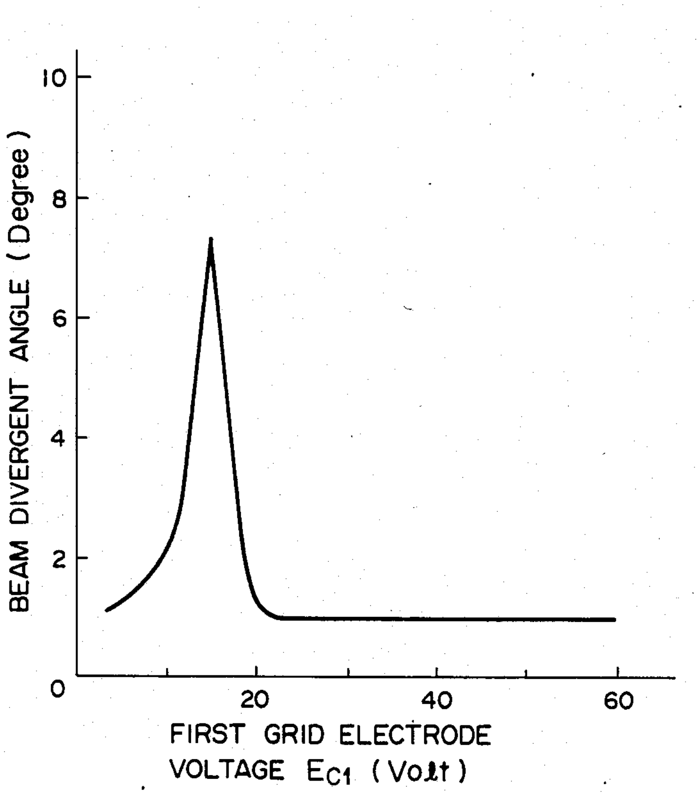
FIG 5 is a graph showing an example of beam divergent angle characteristic according to the invention.
Figure 6A:
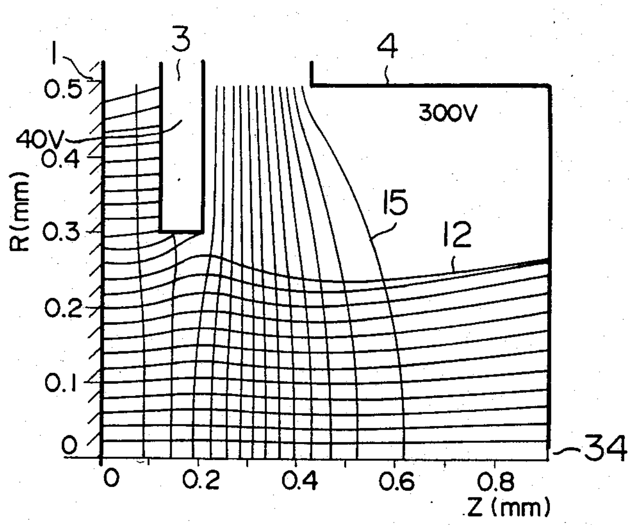
FIG. 6 shows examples of electron trajectory according to the invention.
Figure 6B:
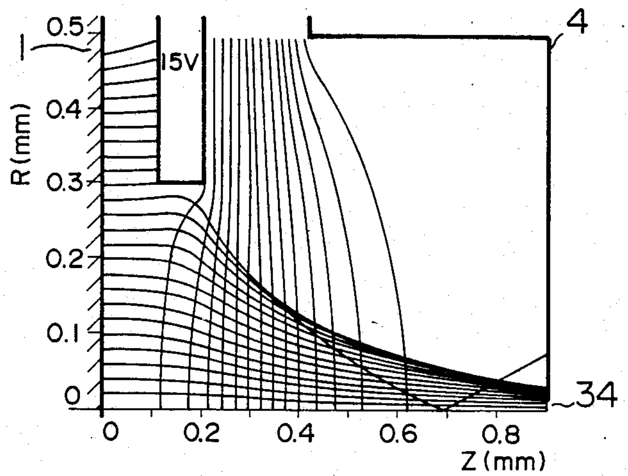
Figure 6C:
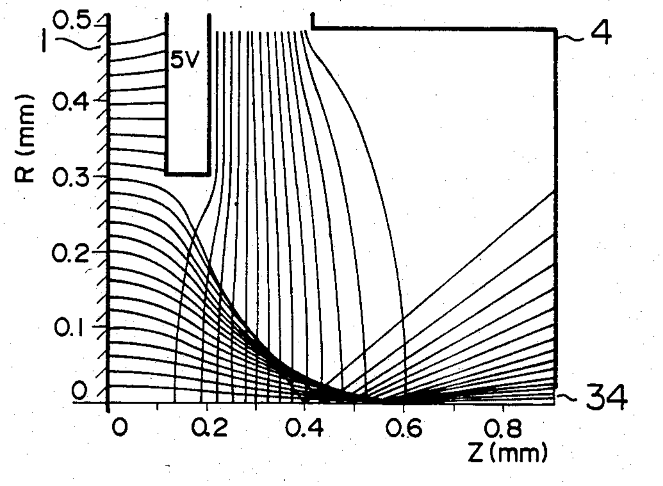

In connection with the first embodiment ($d_2=0.5$ mm), FIG. 5 shows a beam divergent characteristic and FIG. 6 electron trajectories.

As shown in FIG. 5, the divergent angle (also affected by the effect of thermal velocity speed) of the beam passing through the aperture 34 in the second grid electrode 4 changes with the first grid electrode voltage $E_{c1}$. A laminar flow beam having a divergent angle of about 1° is obtained at $E_{c1}$ of about 40 V. This value of 1° of divergent angle corresponds to a beam divergent angle due to only the effect of thermal velocity speed and an electron beam emitted from the cathode surface at an initial velocity of zero becomes a laminar flow beam having a main electron trajectory which is substantially parallel to the tube axis as shown at section (a) in FIG. 6. It will also be seen from FIG. 5 that at $E_{c1}$ of about 15 V, the electron beam becomes a divergent beam having a divergent angle of about 7°.

When the voltage $E_{c1}$ applied to the first grid electrode is set to 40 V, 15 V and 5 V, corresponding electron trajectories are obtained as shown at (a), (b) and (c) in FIG. 6, respectively. In FIG. 6, the main trajectories of the electron beam are represented by reference numeral 12 and equipotential lines by 15. As shown at (a) in FIG. 6, at $E_{c1}=40$ V, a laminar flow beam is formed having an electron trajectory which is substantially parallel to the tube axis. As shown at (b) in FIG. 6, at $E_{c1}=15$ V, a crossover is now being formed near the aperture 34 in the second grid electrode. At $E_{c1}=5$ V, as shown at (c) in FIG. 6, the crossover is formed inside the re-entrant cavity 24 in the second grid electrode.

As described above, according to the foregoing embodiments of this invention, the voltage of the first grid electrode undergoes the reverse swing in contrast to the conventional technique, for reducing the cathode emission current density (cathode loading) to ensure that a high beam current necessary for the ABO operation can be generated stably. During normal operation, however, the first grid electrode voltage is kept high to generate a laminar flow beam which is effective to obtain a low lag and high resolution characteristic. Additionally, since evaporation of barium from the barium impregnated cathode can be suppressed, variations in the effective diameter of the aperture can be suppressed and reduction in the amount of generated beam current can be prevented.

We claim:

1. A television camera tube device comprising:

a cathode electrode for emission of electrons along a beam path;

a first grid electrode following said cathode electrode on said beam path, said first grid electrode having a first aperture and being connected to receive a positive voltage at a first voltage level relative to the potential of said cathode electrode so as to produce a laminar flow electron beam;

a second grid electrode following said first grid electrode on said beam path, said second grid electrode having a second aperture which is smaller than said first aperture and being connected to receive a positive voltage relative to said cathode electrode which is higher in level than that applied to the first grid electrode; and means for decreasing said positive voltage applied to said first grid electrode from said first level to a second level to change said electron beam from a laminar flow beam to a beam having a cross-over adjacent said second grid electrode, thereby increasing the amount of the electrons passing through said second aperture.

2. A television camera tube device according to claim 1, wherein said cathode electrode is of an impregnated cathode.

3. A television camera tube device according to claim 1, wherein said positive voltage applied to said first grid electrode has a maximum value of 50 V.

4. A television camera tube device according to claim 1, wherein the distance between said cathode electrode and said first grid electrode is 0.05 to 0.15 mm, the diameter of said first aperture is 0.1 to 0.5 mm, and the diameter of said second aperture is 0.008 to 0.015 mm.

5. A television camera tube device according to claim 1, wherein said increasing means comprises an automatic beam optimizer.

6. A television camera tube device according to claim 2, wherein said first grid electrode is made of a high melting point material.

7. A television camera tube device comprising:

a cathode electrode for emission of electrons along a beam path;

a first grid electrode following said cathode electrode on said beam path, said first grid electrode having a first aperture and being connected to receive a voltage having a level relative to the potential of said cathode electrode which is sufficiently higher than a voltage capable of producing maximum beam current to provide an electron beam of laminar flow having no cross-over;

a second grid electrode following said first grid electrode on said beam path, said second grid electrode having a second aperture which is smaller than said first aperture and being connected to receive a voltage which is positive relative to said cathode electrode and which is higher in level than that applied to said first grid electrode; and means for decreasing said voltage applied to said first grid electrode to increase the amount of the electrons passing through said second aperture and thereby increase said beam current.

8. A television camera tube device according to claim 7, wherein said cathode electrode is an impregnated cathode.

9. A television camera tube device according to claim 7, wherein said positive voltage applied to said first grid electrode has a maximum value of 50 V.

10. A television camera tube device according to claim 7, wherein the distance between said cathode electrode and said first grid electrode is 0.05 to 0.15 mm, the diameter of said first aperture is 0.1 to 0.5 mm, and the diameter of said second aperture is 0.008 to 0.015 mm.

11. A television camera tube device according to claim 7, wherein said increasing means comprises an automatic beam optimizer.

12. A television camera tube device according to claim 8, wherein said first grid electrode is made of a high melting point material.

* * * * *